Oct. 10, 1967     A. LAMBERT     3,345,715
CLAMPS FOR PICTURE FRAMES
Filed Aug. 31, 1965
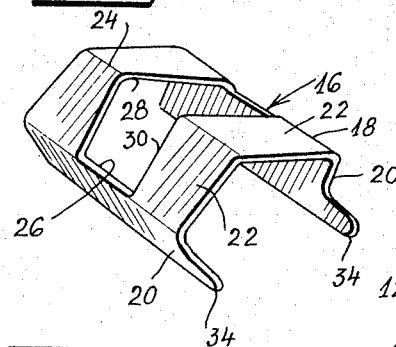
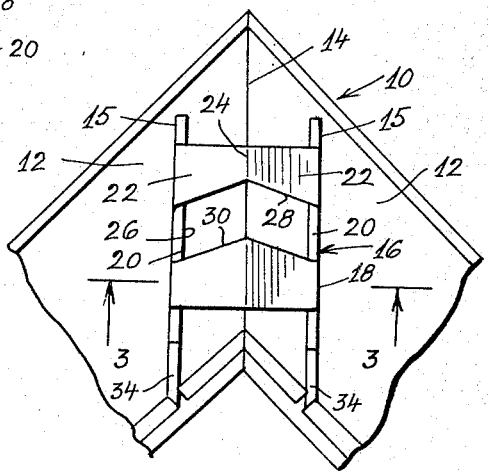
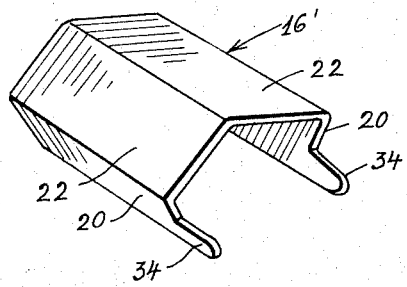
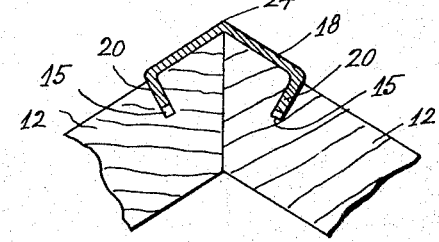
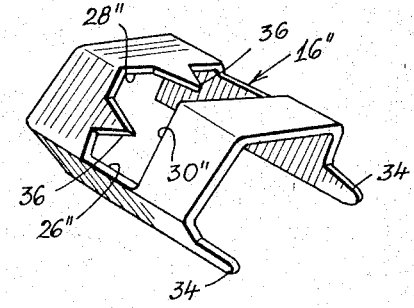
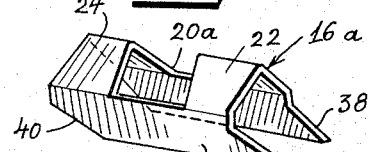
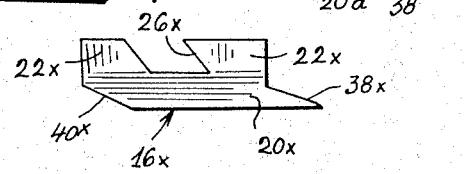
INVENTOR
Alfred Lambert
BY
Polachek & Saulsbury
ATTORNEYS

# United States Patent Office 3,345,715
Patented Oct. 10, 1967

3,345,715
CLAMPS FOR PICTURE FRAMES
Alfred Lambert, Brooklyn, N.Y., assignor to Lambert Frame and Picture Company, Inc., a corporation of New York
Filed Aug. 31, 1965, Ser. No. 483,968
4 Claims. (Cl. 24—259)

ABSTRACT OF THE DISCLOSURE

A corner clamp for a picture frame that has grooved rails, the clamp having an inverted channel-shaped plate body with inwardly slanting side walls and a top wall portion slanting upwardly toward the center, the side walls adapted to be slidably mounted in the grooves in the rails of the frame and adapted to clamp against the walls of the grooves for drawing the edges of the rails together, integral fingers on one end of the side walls serving as handles, the body of the clamp having a transverse cutout portion midway its ends with one edge wall thereof pointing midway its ends for coacting with the material of the rails to prevent displacement of the clamp. In a modified form of clamp, the cutout portion has spaced spurs pointing toward one edge wall of the rail for engaging the material of the rail for preventing displacement of the clamp.

---

This invention relates to new and useful improvements in corner clamps for picture frames.

A primary object of the present invention is to provide a clamp which when placed in position across a joint between two bodies of wood, will act when being forced into position to draw the edges of abutting surfaces of the bodies firmly together.

Another object of the invention according to a modification thereof is to provide a clamp of this kind having holding spurs for preventing the clamp from slipping from position.

Still another object is to provide a clamp of this kind made of sheet metal and of simple construction and capable of being quickly and conveniently placed and secured in position.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a top perspective view of a clamp embodying one form of the invention.

FIG. 2 is a view in plan of the clamp of FIG. 1 shown applied to the corner joint of a picture frame.

FIG. 3 is a sectional view taken on the line 3—3 of FIG. 2.

FIG. 4 is a view similar to FIG. 1 of a clamp embodying a modified form of the invention.

FIG. 5 is a similar view of a clamp embodying yet another modified form of the invention.

FIG. 6 is a similar view of a clamp embodying still another modified form of the invention.

FIG. 7 is a similar view of a clamp embodying a further modified form of the invention.

Referring now more in detail to the various views of the drawings, in FIG. 2 there is shown a corner 10 of a picture frame wherein the ends of the two adjacent rails 12, 12 are brought together to form the angle or mitre joint 14. In the formation of such a joint the top surfaces of the rails 12, 12 are provided at opposite sides of the joint 14 with grooves or kerfs 15, terminating short of the outer edges of the rails but intersecting the inner edges thereof as shown.

The clamp embodying the present invention as best shown in FIG. 1 is indicated generally by the numeral 16 and comprises a substantially inverted channel-shaped body 18 of sheet metal, with the side walls 20 thereof extending the length of the body and slanting inwardly, and with the body portions 22 slanting upwardly from the top of the side walls 20 to a central pointed ridge 24. The body is formed with a rectangular cutout portion 26 transversely thereof at its center. One side of the cutout portion 26 is formed with a slight V-shaped edge 28 and the other side of the cutout portion is formed with a slight inverted V-shaped edge 30. Blunt pointed fingers 34 are formed on the side walls 20 at one end thereof along the bottom thereof forming extensions of the side walls. These fingers permit ready manipulation of the clamp.

In the application of the clamp 16, to the joint of the picture frame as shown in FIG. 2, the clamp is grasped by the fingers 34 at the one end thereof and the other end placed in alignment with the open inner ends of the grooves 15, 15. The side walls 20, 20 are then slid into and along the grooves to the inner closed ends thereof thereby positioning the clamp over the joint 14 of the frame as shown in FIG. 2, with the fingers 34 occupying the outer ends of the grooves. The slanting side walls engaging the groove walls tend to draw the rails 12, 12 toward each other, and these side walls cam against the walls of the grooves and thereby lock the clamp in place. The provision of the fingers 34 greatly facilitate the easy application of the clamp to a joint of this kind.

In FIG. 4 there is a modified form of clamp 16' shown wherein the cutout portion such as cutout portion 26 is omitted.

FIG. 5 illustrates another modified form of clamp 16" wherein one of the edges of the cutout portion 26", the edge 28", is formed with a pair of spurs 36 pointing into the cutout and toward the other edge 30" and disposed on the plane of the body of the clamp.

The modified form of clamp 16a shown in FIG. 6 differs from the clamp 16 of FIG. 1 in that in place of the blunt pointed fingers 34, there are pointed spurs 38 formed integrally with the same ends of the wide walls 20a. The other ends of the side walls are cut away to form slanted edge 40 disposed on the same angle as the angle of the spurs 38. In all other respects the clamp 16a is similar to clamp 16 and similar references are used to indicate similar parts.

The modified form of clamp 16x shown in FIG. 7 comprises a body comprising substantially one-half of the body of the clamp 16a shown in FIG. 6, with the top portions 22x of the body having a cutout portion 26x cut at a slant, the side walls 20x having the slanting spur 38x at one end and the inwardly slanting edge 40x at the other end.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A clamp of the kind described for joining together contacting edges of the rails of a picture frame, said rails having spactd grooves therein and upon opposite sides of said edges, said clamp comprising an inverted channel-shaped plate body having inwardly slanting side walls adapted to be slidably mounted in said grooves and adapted to clamp against the walls of said grooves for drawing the edges together, said inverted channel-shaped plate body having a transverse cutout portion midway its ends, one edge wall of said cutout portion being pointed midway its ends for coacting with the material of the rails to prevent displacement of the clamp.

2. A clamp of the kind described for joining together contacting edges of the rails of a picture frame, said rails having spaced grooves therein and upon opposite sides of edges, said clamp comprising an inverted channel-shaped plate body having inwardly slanting side walls and top wall portions slanting upwardly toward the center to a point from said side walls, said side walls adapted to be slidably mounted in said grooves and adapted to clamp against the walls of said grooves for drawing the edges together, and integral fingers on one end of the side walls at the bottom thereof serving as handles for manipulating the clamp, said inverted channel-shaped body having a transverse cutout portion midway its ends, one edge wall of said cutout portion being pointed midway its ends for coacting with the material of the rails to prevent displacement of the clamp.

3. A clamp as defined in claim 2 wherein the other edge wall of the cutout portion is formed with spaced spurs pointing toward said one edge wall, said spurs adapted to engage the material of the rails to prevent displacement of the clamp.

4. A clamp of the kind described for joining together contacting edges of the rails of a picture frame, said rails having spaced grooves therein and upon opposite sides of said edges, said clamp comprising an inverted channel-shaped plate body having inwardly slanting side walls and top wall portions slanting upwardly toward the center to a point from said side walls, said side walls adapted to be slidably mounted in said grooves and adapted to clamp against the walls of said grooves for drawing the edges together, said inverted channel-shaped body having a transverse cutout portion midway its ends, one edge wall of said cutout portion being pointed midway its ends for coacting with the material of the rails to prevent displacement of the clamp, and integral slanting spurs on one end of the side walls serving as handles for manipulating the clamp, the other end of the side walls being slanted inwardly.

References Cited

UNITED STATES PATENTS

| 967,605 | 8/1910 | Brooks | 229—47 |
| 3,182,847 | 5/1965 | Fuller | 217—65 X |

FOREIGN PATENTS

| 193,487 | 2/1923 | Great Britain. |
| 703,569 | 2/1954 | Great Britain. |

WILLIAM FELDMAN, *Primary Examiner.*

DONALD A. GRIFFIN, *Examiner.*